United States Patent [19]

Collins et al.

[11] Patent Number: 4,470,955
[45] Date of Patent: Sep. 11, 1984

[54] REMOVAL OF TRITIATED SPECIES FROM GAS STREAMS COMPRISED THEREOF

[75] Inventors: Martin F. Collins, Somerset; Romuald Michalek, Hackensack, both of N.J.

[73] Assignee: Engelhard Corporation, Iselin, N.J.

[21] Appl. No.: 101,671

[22] Filed: Dec. 10, 1979

Related U.S. Application Data

[62] Division of Ser. No. 391,862, Aug. 27, 1973, Pat. No. 4,178,350.

[51] Int. Cl.$^3$ .......................... G01D 11/26; C01F 1/00
[52] U.S. Cl. .................... 422/159; 422/119; 422/169; 252/626; 252/630
[58] Field of Search .................. 423/248, 648, 580; 252/626, 630; 422/119, 159, 169, 170, 172, 173, 177, 180, 207, 234, 903

[56] References Cited

U.S. PATENT DOCUMENTS 3,074,776 1/1963 Ryan et al. .......................... 422/159
3,179,487 4/1965 Baldus ................................. 423/248

FOREIGN PATENT DOCUMENTS 164591 2/1953 Australia .
509018 1/1955 Canada .
533058 12/1961 Canada .
1263717 1/1965 Fed. Rep. of Germany .
7225888 7/1972 France .

Primary Examiner—Frank W. Lutter
Assistant Examiner—Chris Konkol

[57] ABSTRACT

Tritiated species, e.g., tritium, tritiated water, and/or tritiated hydrocarbons, are removed from gas streams comprised thereof by reacting the same over a precious metal catalyst with sufficient air or oxygen to convert all tritiated species to tritiated water and, if hydrocarbons are present in the gaseous feedstock, carbon dioxide. The tritiated water and any other moisture that might be present in the reaction effluent are next adsorbed by a desiccant dryer, preferably to a level of less than one part per million. Most desirably, the desiccant dryer effluent is then diluted with non-radioactive water such that the tritiated water is diluted by a factor of at least 1,000 to 1; the resulting water mixture can be adsorbed from the diluted effluent by a second desiccant dryer to provide a value in the ultimate effluent gas of less than about one-half parts per billion tritiated water.

8 Claims, 3 Drawing Figures

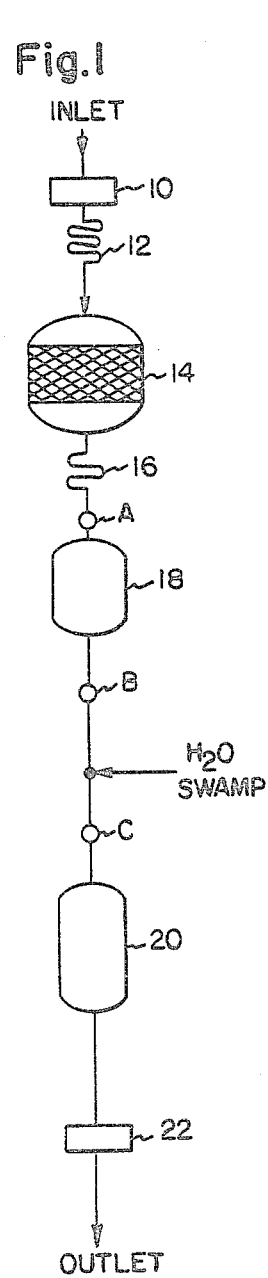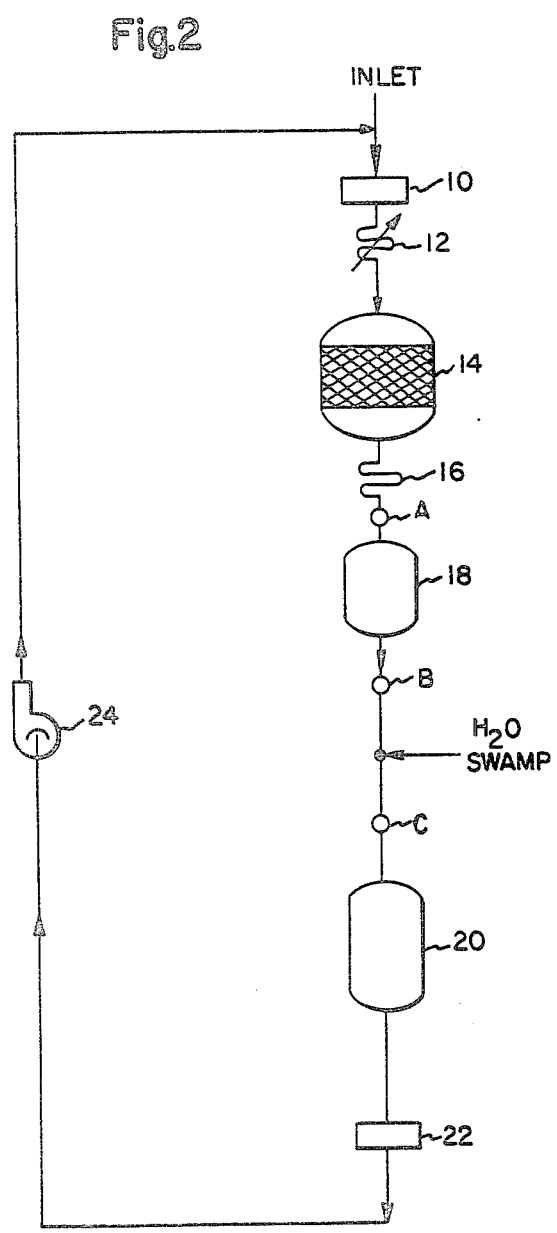

REMOVAL OF TRITIATED SPECIES FROM GAS STREAMS COMPRISED THEREOF

This is a division of application Ser. No. 391,862 filed on Aug. 27, 1973, now U.S. Pat. No. 4,178,350.

BACKGROUND OF THE INVENTION

1. Field of the Invention

This invention relates to the removal of tritium, the radioactive isotope of hydrogen, and/or compounds of tritium, from gas streams comprising the same. More especially, the invention relates to the removal of radioactive tritium and compounds thereof from gas streams comprised of same to concentration levels of parts per billion and even parts per trillion by volume.

2. Description of the Prior Art

Tritium is of course an unstable radioactive isotope having a nucleus consisting of a proton with two neutrons. Believed to be formed in nature by cosmic radiation in the upper atmosphere, natural tritium is present in very minute quantities [one tritium atom per $10^{18}$ protium atoms] in atmospheric hydrogen and rainwater. The natural atmospheric tritium inventory has been increased by thermonuclear weapons testing. Artificial and commercial tritium occur by various other methods. For example, formation of natural tritium is believed to result from primary cosmic-ray reactions or by collisions of fast neutrons, protons, and deuterons in cosmic radiation areas of the upper atmosphere. Artificial tritium can be produced in light and heavy water reactors, cyclotrons, cloud chambers, and the like, by, inter alia: thermal-neutron irradiation of deuterium, $^3$He and $^6$Li in reactor coolants; fission; bombardment of boron, fluorine, and other elements with deuterium; and bombardment of beryllium with deuterons. Tritium is commercially produced via irradiation of enriched lithium or lithium fluoride with subsequent recovery by acid treatment or palladium diffusion techniques.

Tritium itself probably presents a relatively low hazard. It is a low beta emitter, and no special shielding therefor is required. However, it is often encountered in large doses and should be respected accordingly. Moreover, tritium tends to oxidize to tritiated water in which form it is easily absorbed through the skin and lungs. It is therefore a definite hazard and injestion and inhalation of tritiated vapors should be avoided. While gaseous tritium has a low solubility in body fluids and is about $10^{-3}$ times less toxic than tritiated water, certain tritiated compounds may concentrate in various organs resulting in localized high dosages. The biological half-life for tritium can be defined as the time taken for one-half the assimilated activity to be excreted from the body following a single dose of tritium. The typical biological half-life value for tritiated water ranges from between 9 to 14 days. This value can be decreased by increasing fluid intake.

Thus, in the light of the aforesaid toxicity and the various direct and indirect hazards associated with exposure to the tritium molecule, certain restrictions have been placed upon tolerable exposures to tritium and/or any composition or compound thereof. Compare, inter alia, the effluent limitations imposed upon users in Sections 20 and 50 of Title 10 of the Code of Federal Regulations. Further, various studies have also been performed to develop containment systems to protect against the accidental release of tritium from a research and development operation, or from a reactor fuel reprocessing facility, or from other environments. A need nevertheless exists for additional means for the removal of tritium from a given gaseous environment or gas stream, or from ambient following an accidental release of the tritiated species thereto.

SUMMARY OF THE INVENTION

Accordingly, a primary object of this invention is to provide for the removal of tritium, and/or compounds of tritium, from gas streams comprising the same.

Another object of this invention is to provide for the reduction in concentration of tritium or tritiated species in gas streams comprised thereof to levels in the order of parts per billion and even parts per trillion by volume.

Yet another object of the invention is to provide for the utilization of existing, proven catalytic reactor and desiccant dryer technology to remove tritiated species to levels lower than previously possible.

In attaining the objects of this invention, one feature resides in the removal from a process or other gas stream of the radioactive tritium, and/or compounds of tritium, by reacting the tritium or tritium compounds such as tritiated water, and/or tritiated hydrocarbons [hereinafter the "tritiated species"] over a precious metal catalyst with sufficient air or oxygen to convert all of the said tritiated species to tritiated water and, in the case of hydrocarbons, to carbon dioxide. At this point in time, all of the tritium has been converted to tritiated water. The tritiated water, and any other moisture that might be present in the gas stream, is then adsorbed by a desiccant dryer to less than about one part per million total water. Preferably, the effluent from the desiccant dryer is next swamped or flooded with ordinary non-radioactive water [protium oxide, or even deuterium oxide for that matter] to dilute the tritiated water by a factor of at least about 1,000:1. Since the isotopes of hydrogen have transport properties similar to protium, the tritiated water behaves exactly like the non-radioactive water and the total water mixture can then be adsorbed on a second desiccant dryer to a concentration of less than one-half parts per billion tritiated water. By diluting to a value more than about 1,000:1, or by multiple-stage dilution, with nonradioactive water, concentration levels in the order of parts per trillion are readily achieved.

Another feature of the invention resides in monitoring the operability and efficiency of a given catalytic combuster by utilizing tritium as a radioactive gas tracer. For example, in an effort to test the operability and efficiency of a prototype catalytic combuster designed to combust the protium in ambient air from one-half parts per million [by volume] to one-half part per billion [by volume], a catalytic reaction is conducted therein; the space velocity and linear velocity required for the specified reaction [0.5 ppm H$_2$ inlet and 0.5 ppb H$_2$ outlet] are calculated from rate equations. To verify the 0.5 ppb H$_2$ concentration level the combuster effluent gas is analyzed using tritium, the radioactive isotope of hydrogen. Tritium is injected into the inlet air stream in an amount resulting in a concentration of 0.5 ppm. The tritium reacts with oxygen in the same manner that protium does, to form tritium oxide or tritiated water. After removing the tritium oxide [which also behaves the same as normal water], the air stream is analyzed for residual tritium at a level of 0.5 ppb. The amounts of tritium are determined by measuring the radioactivity of the inlet and outlet air streams utilizing a conventional tritiated species monitor.

Other objects, features and advantages of this invention will be become more apparent from the accompanying description when taken in conjunction with the accompanying drawings and wherein like reference numerals are used to reflect like or equivalent elements.

BRIEF DESCRIPTION OF THE DRAWINGS

In the drawings:

FIG. 1 is a schematic diagram of a single-pass tritium removal system according to the invention;

FIG. 2 is a schematic diagram of a closed-loop or recycle tritium removal system according to the invention.

DETAILED DESCRIPTION OF THE INVENTION

Figure 3:
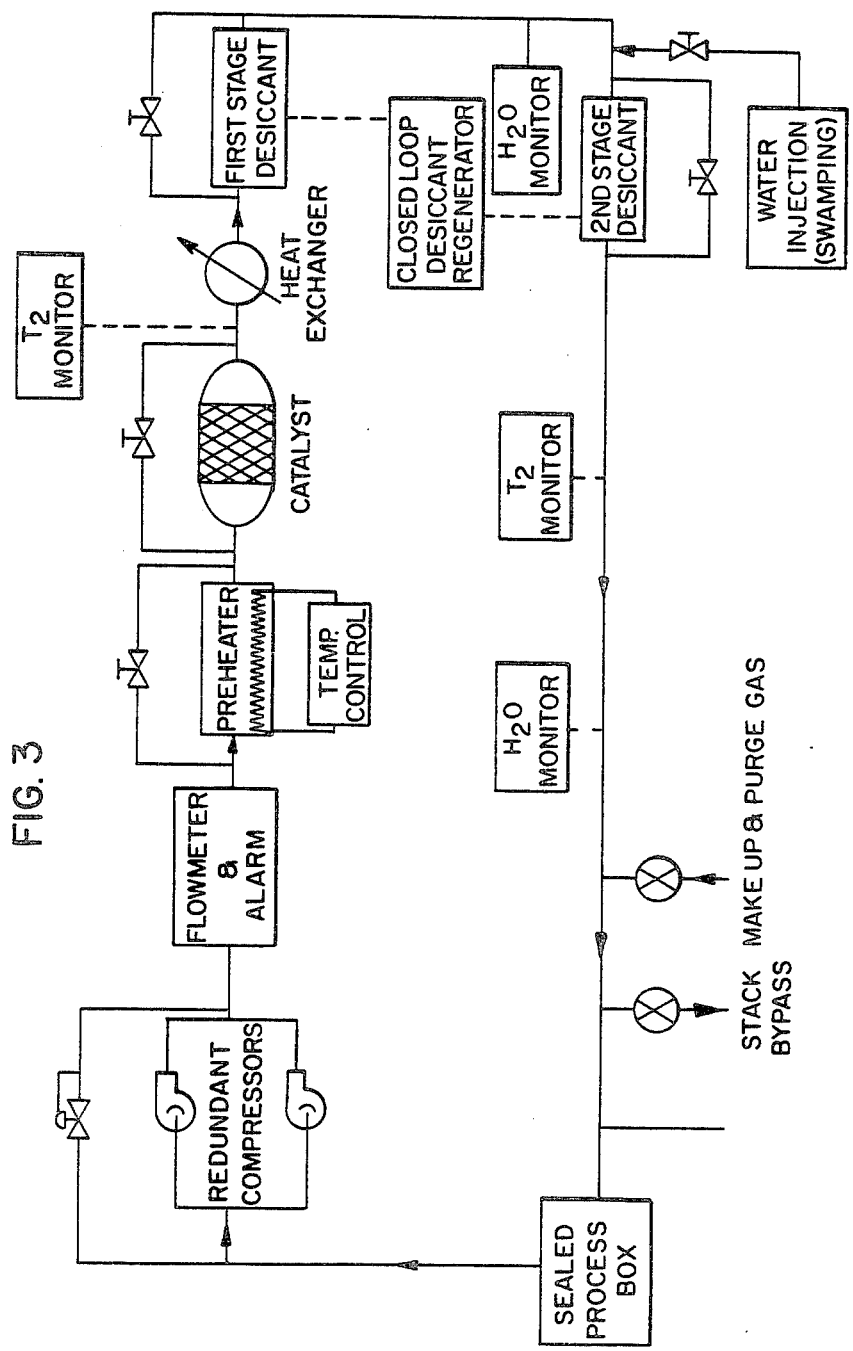
FIG. 3 is a schematic diagram of yet another tritium removal system according to the invention.

In one embodiment in accordance with the invention, as illustrated in FIG. 1, an inlet gas stream of pure, dry air containing about 1,000 parts per million of tritium [verified by first passing the same through the tritiated species monitor 10, advantageously an Overhoff and Associates Betatec 120 tritium monitor with digital and strip chart readout; this instrument is calibrated directly in microcuries per cubic meter and provides fast linear response] is preheated from about 75° F. to about 200° F. to 350° F. in preheater 12. The preheater 12 is provided downstream of the tritiated species monitor 10 but upstream of the catalytic combuster 14 to preclude condensation of an inhibiting layer of moisture on the catalyst surface within the said combuster 14 and to promote the catalytic reaction which is conducted therein. In the catalytic combuster 14, advantageously a tubular stainless steel reactor, oxygen from the air combines with the tritium according to the equation $T_2 + O_2$ to form tritiated water. The reaction appears to be pseudo-1st order in hydrogen and at 200° F. is mainly diffusion controlled. The catalyst in the combuster 14 is of known precious metal type, optionally comprising the typical promoters therefor, and advantageously is supported on a high surface area [in the order of about 200 m²/gm] substrate to assure catalytic reaction to the extreme levels required. Exemplary of the known precious metal catalysts, there are mentioned platinum, palladium, rhodium and the like, and mixtures thereof. Being comprised of a noble metal, the catalyst does not normally require regeneration and will exhibit very long life in a properly operated system. Typical supports comprise alumina, silica, and other ceramics, for example, one-quarter inch diameter alumina spheres. The catalyst can be virtually of any size and shape, dimension and configuration, e.g., one-eighth inch cylindrical pellets, one-eighth inch high and one-eighth inch in diameter.

Temperatures in the combustor 14 are desirably in the range of about 200° F. to 1,000° F. and preferably the temperature of the catalyst bed is about 350° F.; most desirably the combustion reaction is conducted at atmospheric pressure or at pressures higher or lower than atmospheric. Space velocities too can vary over wide limits, advantageously from 3,000 to 60,000 per hour [SCFH gas per cubic feet catalyst or, more simply, the volume of gas per hour/catalyst volume], preferably from 8,000 to 16,000 per hour. Inlet concentrations of tritium in the feed gas are advantageously in the range of from about greater than 0 to about 6 percent, preferably from greater than 0 to about 2 percent by volume.

Upon exiting the catalytic combuster 14, the catalyst effluent is cooled in the gas-to-air or gas-to-water cooler 16 to enhance the efficiency of the first desiccant adsorber 18 to be later described. At point "A" on the schematic of FIG. 1 the gaseous catalyst effluent comprises air now containing approximately 1,000 parts per million of tritiated water, but considerably less than one part per billion of tritium gas.

The cooled, gaseou7 A" on the schematic of FIG. 1 the gaseous catalyst effluent comprises air now containing approximately 1,000 parts per million of tritiated water, but considerably less than one part per billion of tritium gas.

The cooled, gaseous catalyst effluent which now has been reduced in tritium content to the desired one part per billion but which still contains the 1,000 parts per million of tritiated water [$T_2O$] is next subjected to adsorption in a desiccant dryer 18 to reduce the tritiated water concentration to a value of less than one part per million. The ultimate goal of course is $T_2O$ removal to a value of less than one part per billion, a million-fold [1,000 ppm: 1 ppb] reduction. It has been determined according to the invention that at an inlet concentration of 1,000 ppm $T_2O$, a thousand-fold reduction is practical in a single desiccant stage. Therefore, in the adsorber 18 the $T_2O$ content can be reduced from a value of 1,000 ppm to 1 ppm. Thus, the composition of the effluent exiting the desiccant adsorber 18 and at point "B" on the schematic comprises air [approximately 78 percent nitrogen and 21 percent oxygen], containing approximately one part per million $T_2O$, and further comprising less than about one part per billion free tritium gas.

It has further been determined according to the invention that a serial, second stage adsorption on a commercial basis with an inlet concentration of only about 1 ppm will not accomplish the desired $T_2O$ content reduction to 1 ppb. However, by increasing the inlet concentration of water to a second desiccant dryer 20 to 1,000 parts per million by "swamping" the effluent of the adsorber 18 upstream of the inlet port of the adsorber 20 with ordinary non-radioactive water, the thousand-fold reduction of water species can be attained;

1,000 ppm $H_2O$ is reduced to 1 ppm $H_2O$ 1 ppm $T_2O$ is reduced to 1 ppb $T_2O$ Accordingly, by passing the effluent of the adsorber 18 which has been diluted with water [1,000 ppm] at least 1,000:1 through the second adsorber 20, concentration levels of total tritiated species in the effluent from the adsorber 20 in the parts per billion range are achieved. The aforesaid concentrations are verified by the second tritiated species monitor 22, identical to the monitor 10, and at which point "C" in the cycle it is confirmed that the outlet effluent comprises air containing less than about one part per billion tritiated water, less than about one part per million non-radioactive water and less than about one part per billion tritium gas. In fact, the concentration of total tritiated species at the point "C" is itself less than one part per billion.

By diluting more than 1,000:1, or by multiple-stage dilution, with non-radioactive water, concentration levels in the parts per trillion range can be achieved. Many suitable desiccant materials can be used in the adsorbers 18 and 20, for example, the various molecular sieves, silica gels, and others. A preferred desiccant is a 13X Union Carbide synthetic zeolite molecular sieve. It will thus be appreciated that by use of the above described process, existing proven catalytic reactor and desiccant dryer technology can be used to remove tritiated species from various gas streams to levels much lower than previously were possible. Also, inexpensive water can be used as a diluent.

In many instances, hereinbelow more fully explained, it may be mandatory or desirable to recycle tritium-containing gas streams in the closed-loop system as illustrated in FIG. 2. The tritium removal system of said FIG. 2 essentially corresponds to that of FIG. 1, albeit a trace of methane [CH$_4$] or other hydrocarbons is presumed to be present in the inlet air stream. This is a realistic assumption with respect to normal air. And this can become a significant matter for concern in terms of hydrogen isotopic transfer phenomenon in closed-loop systems. The system of FIG. 2 also differs from that of FIG. 1 in that the preheater 12 is provided with variable temperature controls, and a pump or recycle blower 24 is included to recycle the system effluent in a closed-loop.

Hydrocarbons, such as methane, circulating in closed-loop systems can give rise to protium-tritium isotopic exchange within the hydrocarbon molecule. This could lead to a build-up of tritiated hydrocarbons in an improperly designed closed-loop system. But by providing the preheater temperature controls and by closely monitoring the catalyst parameter this problem can be readily avoided. More specifically, many catalytic reactions are temperature dependent. This characteristic can be used to advantage in providing selectivity of reactions over the catalyst. For example, the reaction $2T_2+O_2=2T_2O$ or $2HT+O_2=2HTO$ can initiate on the catalyst at a catalyst inlet temperature equal to about room temperature in some instances.

On the other hand, catalytic conversion of hydrocarbons to facilitate their removal and prevent build-up of tritiated hydrocarbons may require higher preheat temperatures. For example, the following reaction may be desired:

When converted to carbon dioxide and tritiated water, the hydrocarbons can be removed from the gas stream. This reaction may require a catalyst inlet temperature of several hundred degrees Fahrenheit.

Thus, to assure proper reaction control and catalyst performance, the closed-loop tritium removal system of FIG. 2 is provided with variable preheater temperature controls. The catalyst is of course properly matched with the inlet gas stream, bearing in mind factors such as oxidizing, reducing or inert carrier gases to maximize its efficiency and prolong its life.

The system of FIG. 2 will otherwise function as above described with respect to the single-pass system depicted in FIG. 1. However, hydrocarbons, now converted to CO$_2$ and HTO, will also be adsorbed and removed, which precludes the circulation and build-up of tritiated hydrocarbons by the isotopic hydrogen transfer mechanism.

In one example of the invention according to FIG. 2, the inlet gas stream is pure, dry air containing about 1,000 parts per million of tritium and a trace amount of methane. The tritium content is again verified by means of the tritiated species monitor 10. Possible catalytic reactions occurring in the catalytic combuster 14 comprise the following:

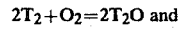

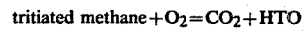

At point "A" on the schematic of FIG. 2, the gaseous catalyst effluent comprises air containing approximately 1,000 parts per million of both T$_2$O and HTO, trace amounts of CO$_2$, but considerably less than one part per billion of tritium gas. At point "B", the composition of the effluent exiting the first stage desiccant adsorber 18 comprises air, containing approximately one part per million tritiated water and further comprising less than about one part per billion free tritium gas. At point "C", downstream of the non-radioactive water swamping with about 1,000 parts per million of such water, the air contains about one part per million tritiated water, about 1,000 parts per million non-radioactive water and less than one part per billion tritium gas. All forms of water are adsorbed in the second stage desiccant adsorber 20, the effluent therefrom, as verified by the tritiated species monitor 22, having a composition of air containing less than one part per billion tritiated water, less than one part per million total water and less than one part per billion T$_2$. This effluent gas is conveniently recycled by means of the blower 24 to an inlet point upstream of the first tritiated species monitor 10.

The adsorbed oxides of all hydrogen isotopes on the desiccant materials in the adsorbers 18 and 20 can be regenerated or otherwise processed by the Atomic Energy Commission.

A wide variety of other gas mixtures can be processed according to the present invention, e.g., those comprised of orgon, helium, nitrogen, and the like. Additional techniques such as multi-stage catalysts may be combined with swamping to provide increased performance. Systems have also been designed affording special attention to adsorbent bed regeneration and other loops which contain highly concentrated radioactive gases. A typical such package is illustrated in schematic form in FIG. 3.

It will thus be appreciated that this invention provides for the ready removal of tritiated species from gas streams comprised thereof to concentration levels of the order of parts per billion and even parts per trillion by volume. Previously suggested processes utilized several stages of catalytic reaction with subsequent desiccant adsorption, addition of protium and/or deuterium, and reaction in a second catalytic reactor with subsequent adsorption in a second desiccant bed. Diluting with water prior to entering the second desiccant bed is a considerable advantage over diluting with protium or deuterium in a two-stage catalytic bed.

It will also be appreciated that while the description herein has essentially been oriented with respect to the removal of tritium and tritiated species from gas streams comprising the same, the invention is equally applicable to the removal of hydrogen, e.g., protium and deuterium, from gas streams comprising these particular species.

While the invention has been described and illustrated with reference to certain preferred embodiments thereof, those skilled in the art will appreciate that various modifications, changes, omissions and substitutions can be made without departing from the spirit of the invention. It is intended, therefore, that the invention be limited only the the scope of the following claims.

What is claimed is:

1. Apparatus for removing tritium and tritium-containing compounds from a gas stream, said apparatus comprising, in combination,
   a catalytic combustion zone for oxidizing tritium and combustible tritium-containing compounds to carbon dioxide and water;
   first water removal means receivably positioned downstream of said catalytic combustion zone for drying effluent from said catalytic combustion zone;
   means for aqueous-flooding of dried effluent with ordinary water downstream from said water removal means;
   additional water removal means for drying the aqueous-flooded effluent; and,
   means for recycling treated effluent to said catalytic combustion zone as desired; whereby tritium is substantially removed as tritiated water by two or more water removal means in contact with tritium-containing effluent of progressively increased dilution.

2. The apparatus as defined by claim 1, wherein the first water removal means for removing water fraction from catalytic combustion zone effluent comprises a desiccant dryer.

3. The apparatus as defined by claim 1, wherein both water removal means comprise desiccant dryers.

4. The apparatus of claim 1 containing a preheater positioned upstream of the catalytic combustion zone and a cooling means positioned downstream thereof but upstream of said first water removal means.

5. The apparatus of claim 4 comprising a tritated species monitor positioned upstream of the said preheater.

6. The apparatus of claim 5 comprising means for recycling treated effluent from said additional water removal means to a point upstream of said preheater.

7. The apparatus of claim 4 wherein the preheater is provided with variable temperature control.

8. The apparatus of claim 1 wherein means for aqueous-flooding of dried effluent comprises ordinary non-radioactive water.

* * * * *